United States Patent
Ohkubo (10) Patent No.: US 7,079,280 B2
(45) Date of Patent: Jul. 18, 2006

(54) COLOR CONVERSION DEFINITION CREATING METHOD AND COLOR CONVERSION DEFINITION CREATING PROGRAM STORAGE MEDIUM

(75) Inventor: Akito Ohkubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 995 days.

(21) Appl. No.: 10/119,115

(22) Filed: Apr. 10, 2002

(65) Prior Publication Data

US 2002/0163659 A1  Nov. 7, 2002

(30) Foreign Application Priority Data

Apr. 16, 2001  (JP)  ............... 2001-116700

(51) Int. Cl.
*G06K 15/00* (2006.01)
*H04N 1/46* (2006.01)

(52) U.S. Cl. .............. 358/1.6; 358/530; 358/515; 358/504

(58) Field of Classification Search .......... 358/1.3, 358/1.9, 501, 504, 515, 530, 1.6; 382/162, 382/167; 345/591, 590, 603
See application file for complete search history.

(56) References Cited

U.S. PATENT DOCUMENTS

| | | | | |
|---|---|---|---|---|
| 6,671,067 B1* | 12/2003 | Adam et al. | .................. | 358/1.6 |
| 2004/0078299 A1* | 4/2004 | Down-Logan et al. | ........ | 705/27 |
| 2004/0199346 A1* | 10/2004 | Stokes | .......................... | 702/88 |
| 2005/0078122 A1* | 4/2005 | Ohga | .......................... | 345/589 |
| 2005/0141046 A1* | 6/2005 | Kito et al. | .................. | 358/471 |

FOREIGN PATENT DOCUMENTS

| | | |
|---|---|---|
| JP | 60-105376 | 6/1985 |
| JP | 61-288662 | 12/1986 |
| JP | 2-214266 | 8/1990 |
| JP | 4-196675 | 7/1992 |

* cited by examiner

*Primary Examiner*—Jerome Grant, II
(74) *Attorney, Agent, or Firm*—Sughrue Mion, PLLC (57) ABSTRACT

To create a color conversion definition defining an association between a color in an arbitrary gamut and a color in a color in a target gamut, there are provided a definition creating step of creating a first color conversion defining an association between a color in a reference gamut close to the arbitrary gamut and a color in the arbitrary, and a definition combination step of combining a second color conversion definition created beforehand defining an association between a color in the reference gamut and a color in the target gamut, with the first color conversion definition created in said definition creating step.

16 Claims, 9 Drawing Sheets

COLOR CONVERSION DEFINITION CREATING METHOD AND COLOR CONVERSION DEFINITION CREATING PROGRAM STORAGE MEDIUM

BACKGROUND OF THE INVENTION

1. Field of the Invention

The present invention relates to a color conversion definition creating method of creating a color conversion definition defining an association between a color in a color representation area of an arbitrary device and a color in a color representation area of a predetermined target device, and a color conversion definition creating program storage medium storing a color conversion definition creating program for creating a color conversion definition.

2. Description of the Related Art

There is known various types of input devices for obtaining image data through input of an image, for example, a color scanner for reading a recorded image to obtain image data and a digital still camera (DSC) in which image data is obtained in such a manner that an image of a subject is formed on a solid state imaging device and then read. In those input devices, the image data is represented by data of a predetermined range of for example 0 to 255 on each of three colors for example red (R), green (G) and blue (B). Colors, which can be represented by numerical values in the predetermined range on each of those three colors of R, G and B, are restricted as a matter of course. For this reason, even if colors of the original image have very plentiful representation, conversion of the colors into image data once using such an input device causes an image represented by the image data to be restricted to the colors in a certain color representation area in the R, G and B color space.

Also with respect to an output device for outputting an image in accordance with image data, there are known various types of output devices, for example, a photographic printer in which a printing paper is exposed by a laser beam to develop the printing paper so that an image is recorded on the printing paper, a printer in which an image is recorded on a sheet in accordance with a system such as an electrophotographic system and an inkjet system, a printing machine in which a rotary press is rotated to create a number of printed matters, and an emissive display device such as a CRT display and a plasma display in which light is emitted on a display screen in accordance with image data to display an image. Also with respect to an output device, similar to the above-mentioned input device, there exists a color reproduction area according to the associated output device. That is, the output device is able to represent various colors in accordance with for example image data representative of three colors of R, G and B or image data representative of four colors of C (cyan), M (magenta), Y (yellow) and K (black). However, colors, which can be represented, are restricted to a certain color representation area (for example, a color representation area represented by numerical values of a range of 0 to 255 on each of colors of R, G and B) in an output device color space (for example, an RGB space and a CMYK space). The color representation area in the above-mentioned input device and output device is referred to as a color gamut.

Recently, there is increased a tendency that image data is used on a common basis between the input device and the output device, and there is known a way of keeping a color of an image to be equivalent between the input device and the output device.

However, as mentioned above, since the color representation area is different in the respective devices, the use of image data on a common basis according to the way of keeping a color of an image to be equivalent may bring about an omission in color representation on a portion in which color representation areas are not coincident with one another. A large omission involves unnaturalness in an image represented by image data used in a common basis.

On the other hand, it is empirically known that regardless of the fact that the color representation is different, it is possible to represent the originally same image as a natural image for person's eyes in the various devices. The natural images represented by the various types of devices are represented by colors mutually different somewhat in accordance with a difference in the color representation area of devices. However, a person may get the natural impression on images represented by any devices, since adaptability of person's eyes is high.

Thus, there is needed a color conversion for converting a color of an image to keep the natural impression for the image in the use of image data on a common basis. It is desired that such a color conversion is a color conversion that colors in a color representation area (a color gamut) of a certain device are completely associated with colors in a color representation area (a color gamut) of another device. This color conversion is referred to as a gamut mapping.

As the conventional color conversion (gamut mapping), there is known, for example, a technology that a common color space (a device-independent-data space), which is independent of a device, for example, an L*a*b* color space, is placed at the middle, and image data on a color space depending on an input device, which is obtained by the input device, is converted into image data on a common color space to perform a gamut mapping on the common color space, and then the image data subjected to the gamut mapping is converted into image data on a color space dependent on an output device (cf. for example, Japanese Patent Application Laid Open Gazette Sho. 60-105376, Japanese Patent Application Laid Open Gazette Sho. 61-288662, and Japanese Patent Application Laid Open Gazette Hei. 4-196675).

Further, in view of a matter that the finally necessary image data is image data in a color space (an output color space) depending on a predetermined device, there is also proposed such a technology that image data is converted into image data on the color space depending on the device, and data exceeding the range of for example 0 to 255 on each of R, G and B on the color space (e.g. the RGB space) are subjected to a compression processing that negative data is clipped to 0 and data exceeding 255 is clipped to 255 so that data on each of R, G and B are compressed to the range of 0 to 255 (Japanese Patent Application Laid Open Gazette Hei. 2-214266 (compression as to the CMYK space), and Japanese Patent Application Laid Open Gazette Hei. 4-334267 (compression as to density)). This is a simple technology and corresponds to an example of a gamut mapping in a device-dependent color space.

It often happens that such a gamut mapping is performed in accordance with a color conversion definition defining the association between a color in a certain color representation area and a color in another color representation area. An appropriate color conversion definition makes it possible to implement a gamut mapping keeping a natural impression for an image. Such an appropriate color conversion definition is referred to as a high quality of color conversion definition.

There is proposed an algorithm for creating such a high quality of color conversion definition by a computer and the like. However, there is no almighty algorithm, and in order to create a high quality of color conversion definition, in many cases, there is a need of know-how and trial and error.

However, it is considered that an environment of needs of gamut mapping will be more expanded as computer and communication technology advance, and there is desired a color conversion definition creating method capable of readily creating a high quality of color conversion definition when it is needed.

SUMMARY OF THE INVENTION

In view of the foregoing, it is an object of the present invention to provide a color conversion definition creating method capable of readily creating a high quality of color conversion definition, and a color conversion definition creating program storage medium storing a color conversion definition creating program capable of readily creating a high quality of color conversion definition.

To achieve the above-mentioned object, the present invention provides a first color conversion definition creating method of creating a color conversion definition defining an association between a color in a color representation area of an arbitrary device mediating between a color image and image data and a color in a color representation area of a predetermined target device mediating between a color image and image data, said color conversion definition creating method comprising:

a definition creating step of creating a first color conversion defining an association between a color in a predetermined reference color representation area wherein an area difference between the reference color representation area and the color representation area of the arbitrary device is smaller than an area difference between the reference color representation area and the color representation area of the target device, and a color in the color representation area of the arbitrary device; and a definition combination step of combining a second color conversion definition created beforehand defining an association between a color in the reference color representation area and a color in a color representation area of the target device, with the first color conversion definition created in said definition creating step.

To achieve the above-mentioned object, the present invention provides a second color conversion definition creating method of creating a color conversion definition defining an association between a color in a color representation area of an arbitrary device mediating between a color image and image data and a color in a color representation area of a predetermined target device mediating between a color image and image data, said color conversion definition creating method comprising:

a definition creating step of creating a first color conversion defining an association between a color in a predetermined reference color representation area wherein a maximum color difference between the reference color representation area and the color representation area of the arbitrary device is not above than 40, and a color in the color representation area of the arbitrary device; and a definition combination step of combining a second color conversion definition created beforehand defining an association between a color in the reference color representation area and a color in a color representation area of the target device, with the first color conversion definition created in said definition creating step.

To achieve the above-mentioned object, the present invention provides a third color conversion definition creating method of creating a color conversion definition defining an association between a color in a color representation area of an arbitrary device mediating between a color image and image data and a color in a color representation area of a predetermined target device mediating between a color image and image data, said color conversion definition creating method comprising:

a definition creating step of creating a first color conversion defining an association between a color in a color representation area of a reference device which is the same as the arbitrary device in sort, and a color in the color representation area of the arbitrary device; and a definition combination step of combining a second color conversion definition created beforehand defining an association between a color in the color representation area of the reference device and a color in a color representation area of the target device, with the first color conversion definition created in said definition creating step.

Here, it is acceptable that the "arbitrary device", the "target device" and the "reference device" are an input device for obtaining image data from an image, or an output device for obtaining an image from image data.

According to the first, second and third color conversion definition creating method of the present invention as mentioned above, a color conversion definition is created via a reference color representation area (a color representation area of the reference device) "close" to a color representation area of the arbitrary device. Thus, preparation of minor suitable reference color representation area (a color representation area of the reference device) makes it possible to readily create a high quality of color conversion definition according to a various type of arbitrary device.

A concept that the reference color representation area (a color representation area of the reference device) is "close" to the color representation area of the arbitrary device includes three meanings, which will be described later. It is an important matter that the reference color representation area (a color representation area of the reference device) is "close" to the color representation area of the arbitrary device in meaning of at least any one of those three meanings. Of those three meanings, the first meaning implies that the reference color representation area (a color representation area of the reference device) is close to the color representation area of the arbitrary device rather than the color representation area of the target device. The second meaning implies that a maximum color difference between the reference color representation area (a color representation area of the reference device) and the color representation area of the arbitrary device is not above than 40. The third meaning implies that geometry of the reference color representation area (a color representation area of the reference device) is approximate to geometry of the color representation area of the arbitrary device.

It is known that geometry of the color representation area depends on a sort of devices. If both the arbitrary device and the reference device are the "same sort of device", the "close" relation in the third meaning as mentioned above is established.

Hereinafter, preferable ones as the "same sort of device" will be enumerated.

(1) A light-emission type of display device in which light is emitted in accordance with image data to display an image:

(1_1) A CRT display device.

(1_2) A liquid crystal display device.

(2) An object color type of device wherein colors according to image data are applied to a medium to create an image:

(2_1) A color material including type of device in which an image is formed on a medium including a material coloring in response to the stimulation in such a manner that a predetermined sort of stimulation is applied to the medium in accordance with image data.

(2_1_1) A photosensitive coloring type of device in which an image is formed on a medium including a photosensitive coloring material coloring in response to light in such a manner that light according to image data is projected on the medium.

(2_1_2) A heat sensitive type of device in which an image is formed on a medium including a heat sensitive coloring material coloring in response to heat in such a manner that heat according to image data is applied to the medium.

(2_2) A color material applying type of device in which an image is formed on a medium in such a manner that a color material is applied to the medium in accordance with image data:

(2_2_1) An ink applying type of device in which an image is formed on a medium in such a manner that ink is applied to the medium in accordance with image data.

(2_2_2) A toner applying type of device in which an image is formed on a medium in such a manner that color toner is applied to the medium in accordance with image data.

To achieve the above-mentioned object, the present invention provides a first color conversion definition creating program storage medium storing a color conversion definition creating program for creating a color conversion definition defining an association between a color in a color representation area of an arbitrary device mediating between a color image and image data and a color in a color representation area of a predetermined target device mediating between a color image and image data, said color conversion definition creating program storage medium storing the color conversion definition creating program for creating the color conversion definition in accordance with a color conversion definition creating method, said color conversion definition creating method comprising:

a definition creating step of creating a first color conversion defining an association between a color in a predetermined reference color representation area wherein an area difference between the reference color representation area and the color representation area of the arbitrary device is smaller than an area difference between the reference color representation area and the color representation area of the target device, and a color in the color representation area of the arbitrary device; and a definition combination step of combining a second color conversion definition created beforehand defining an association between a color in the reference color representation area and a color in a color representation area of the target device, with the first color conversion definition created in said definition creating step.

To achieve the above-mentioned object, the present invention provides a second color conversion definition creating program storage medium storing a color conversion definition creating program for creating a color conversion definition defining an association between a color in a color representation area of an arbitrary device mediating between a color image and image data and a color in a color representation area of a predetermined target device mediating between a color image and image data, said color conversion definition creating program storage medium storing the color conversion definition creating program for creating the color conversion definition in accordance with a color conversion definition creating method, said color conversion definition creating method comprising:

a definition creating step of creating a first color conversion defining an association between a color in a predetermined reference color representation area wherein a maximum color difference between the reference color representation area and the color representation area of the arbitrary device is not above than 40, and a color in the color representation area of the arbitrary device; and a definition combination step of combining a second color conversion definition created beforehand defining an association between a color in the reference color representation area and a color in a color representation area of the target device, with the first color conversion definition created in said definition creating step.

To achieve the above-mentioned object, the present invention provides a third color conversion definition creating program storage medium storing a color conversion definition creating program for creating a color conversion definition defining an association between a color in a color representation area of an arbitrary device mediating between a color image and image data and a color in a color representation area of a predetermined target device mediating between a color image and image data, said color conversion definition creating program storage medium storing the color conversion definition creating program for creating the color conversion definition in accordance with a color conversion definition creating method, said color conversion definition creating method comprising:

a definition creating step of creating a first color conversion defining an association between a color in a color representation area of a reference device which is the same as the arbitrary device in sort, and a color in the color representation area of the arbitrary device; and a definition combination step of combining a second color conversion definition created beforehand defining an association between a color in the color representation area of the reference device and a color in a color representation area of the target device, with the first color conversion definition created in said definition creating step.

As to the color conversion definition creating program referred to in the present invention, only the basic forms are simply shown, for the purpose of avoiding redundancy. The color conversion definition creating program referred to in the present invention includes not only the color conversion definition creating program of the above-mentioned basic forms, but also various forms of color conversion definition creating program corresponding to the forms of color conversion definition creating method as mentioned above.

DETAILED DESCRIPTION OF PREFERRED EMBODIMENTS

Embodiments of the present invention will be described with reference to the accompanying drawings.

Figure 1:
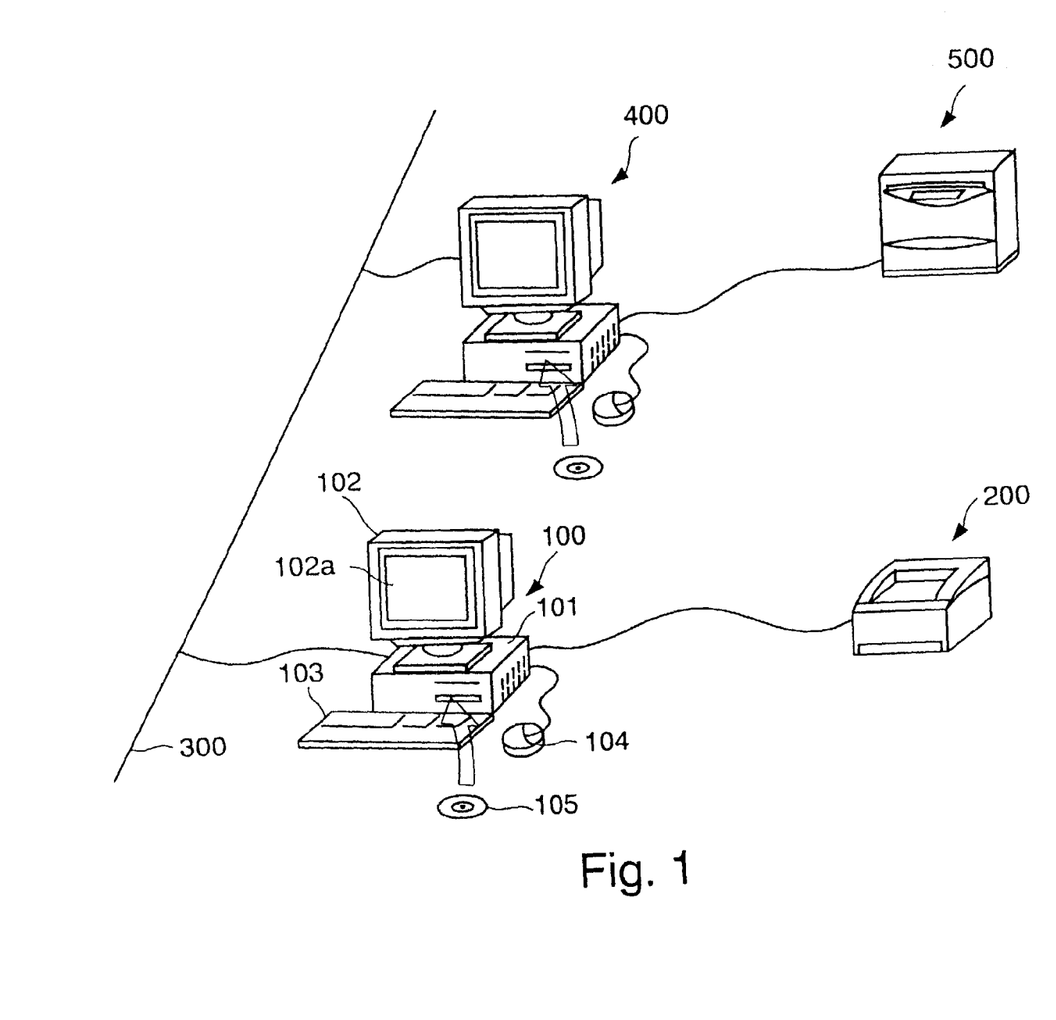
FIG. 1 is a schematic construction view of a computer network in which an embodiment of a color conversion definition creating method according to the present invention is applied.

FIG. 1 is a schematic construction view of a computer network in which an embodiment of a color conversion definition creating method according to the present invention is applied.

FIG. 1 exemplarily shows a computer network in which a first printer 200 and a second printer 500 are incorporated therein.

The first printer 200 and the second printer 500 are connected to computer systems 100 and 400, respectively. The computer systems 100 and 400 are connected to one another via a communication network 300, and also connected to an external computer system (not illustrated) via the communication network 300. The computer systems 100 and 400 give and take image data therebetween or with the external computer system (not illustrated), so that images represented by the image data are outputted to the printers 200 and 500, respectively. Incidentally, it is acceptable that image data is given and taken through a storage medium such as CD-R (Compact Disc Recordable) and MO disk (magneto-optical disk), other than being given and taken via the communication network.

The computer systems 100 and 400 cause images, which are outputted by the printers 200 and 500, to be displayed on display screens of the associated CRT displays, respectively, in order to confirm the outputted images. Thus, when the image is displayed on the display screen, it is necessary that image data for a printer is converted into image data for a display, and when this conversion is performed, the image data is subjected to a predetermined data processing including the gamut mapping and the like. The gamut mapping accords with a combination of a color representation area of a printer and a color representation area of a display. Accordingly, a color conversion definition defining the gamut mapping also accords with a combination of a color representation area of a printer and a color representation area of a display.

While it is acceptable that a maker of the display and a maker of the printer incorporate the color conversion definition into the computer systems 100 and 400, the explanation will be made assuming that the color conversion definition is provided by the computer systems 100 and 400. In this case, the first printer 200 and the second printer 500 correspond to an example of the arbitrary device referred to in the present invention, and the displays incorporated into the computer systems 100 and 400 correspond to an example of the target device referred to in the present invention. In the following explanation, the computer system 100 represents the computer systems 100 and 400.

The computer system 100 shown in FIG. 1 comprises a main frame 101, which incorporates a CPU, a main memory unit, a hard disk, a communicating board, etc., a CRT display 102 for performing a display of image planes and character strings on a display screen 102a in accordance with an instruction from the main frame 101, a keyboard 103 for entering user's instruction and character information into the computer system 100, and a mouse 104 for designating an arbitrary position on the display screen 102a to enter an instruction according to an icon displayed on the designated position.

A CD-ROM 105 is detachably mounted on the main frame 101, and the main frame 101 incorporates therein a CD-ROM drive to reproduce information stored in the CD-ROM 105 thus mounted. Further, MO (magneto-optical disk) 106 (cf. FIG. 2) is detachably mounted on the main frame 101, and the main frame 101 also incorporates therein a MO drive to perform recording and reproduction for information onto the MO 106 thus mounted.

Figure 2:
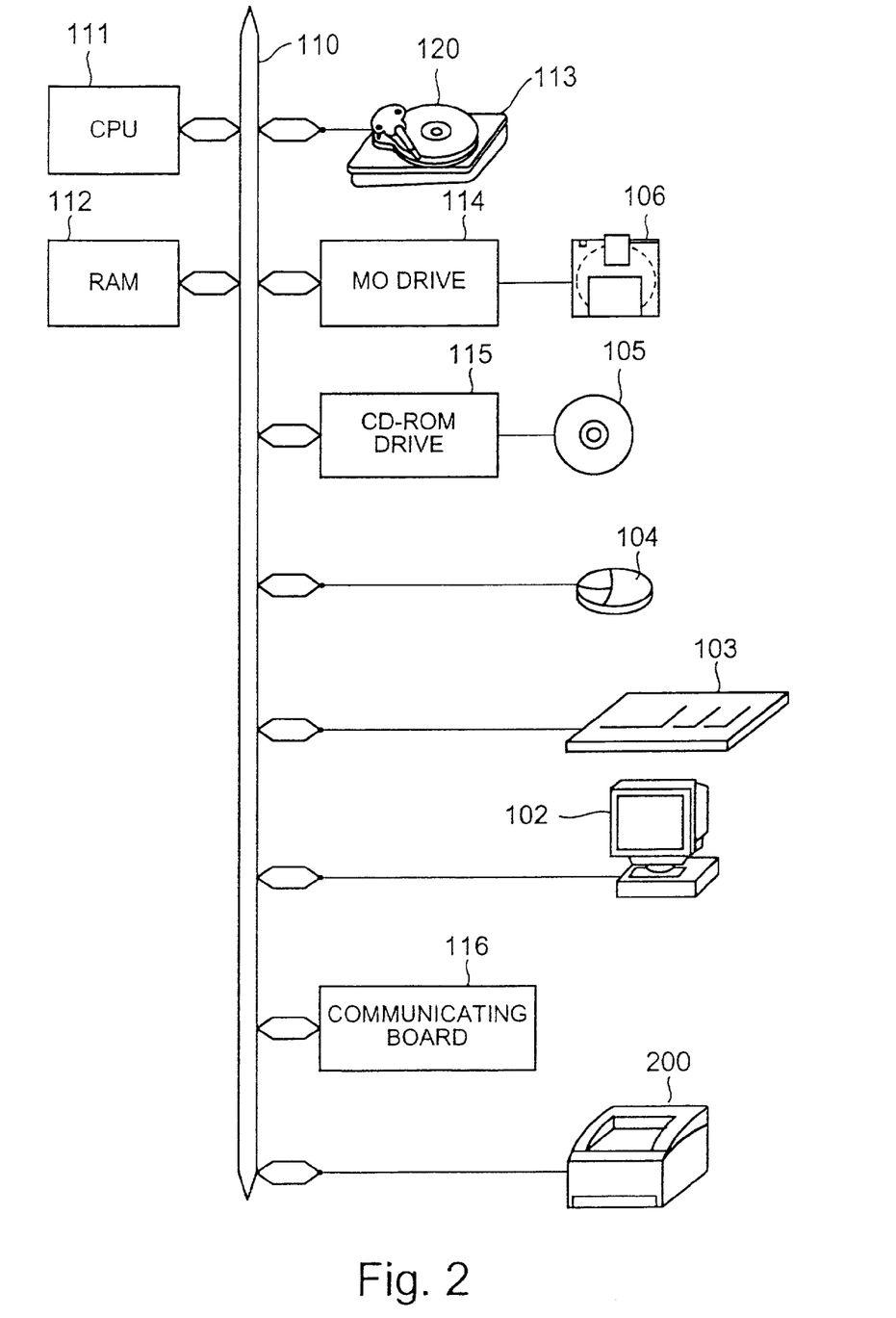
FIG. 2 is a hardware construction view of the computer system shown in FIG. 1.

FIG. 2 is a hardware construction view of the computer system shown in FIG. 1.

The hardware construction view of the computer system shows a CPU 111, a RAM 112, an HDD (a hard disk drive) 113, a MO drive 114, a CD-ROM drive 115, and a communicating board 116. Those are connected to one another through a bus 110.

The HDD 113 incorporates therein a hard disk 120, which is a sort of recording medium, and performs recording and reproduction for information onto the hard disk 120.

The communicating board 116 is connected to a communication line such as a LAN (Local Area Network). The computer system 100 shown in FIG. 1 is able to perform transmission and reception of data with another computer system, such as the computer system 400, through the communication network 300 connected via the communicating board 116.

FIG. 2 further shows a mouse 104, a keyboard 103, a CRT display 102 and a printer 200, which are connected via a plurality of I/O interfaces (not illustrated) to the bus 110.

According to the present embodiment, the CD-ROM 105 stores the color conversion definition program referred to in the present invention. The CD-ROM 105, which stores the color conversion definition program, corresponds to an embodiment of the color conversion definition program storage medium of the present invention.

The CD-ROM 105 is mounted on the main frame 101, so that the color conversion definition program stored in the CD-ROM 105 is read by the CD-ROM drive 115 and is installed via the bus 110 in the hard disk 120.

When the color conversion definition program installed in the hard disk 120 is driven, the color conversion definition program in the hard disk 120 is loaded onto a RAM 112 and is executed by the CPU 111.

Incidentally, the color conversion definition program stored in the CD-ROM 105 is installed in the hard disk of the computer system 100. The hard disk, in which the color conversion definition program is installed, corresponds to an embodiment of the color conversion definition program storage medium of the present invention.

In FIG. 1, as the storage medium for storing the color conversion definition program, there is used the CD-ROM 105. However, the storage medium for storing the color conversion definition program referred to in the present invention is not restricted to the CD-ROM. It is acceptable to adopt, as the storage medium, an optical disk, a magneto-optical disk, a floppy (registered trademark), and a magnetic tape. Those types of storage medium storing the color conversion definition program correspond to an embodiment of the color conversion definition program storage medium of the present invention.

Thus, when the computer system 100 executes the color conversion definition program, a LUT (Look Up Table) format of color conversion definition is created in accordance with an embodiment of a color conversion definition creating method of the present invention.

Figure 3:
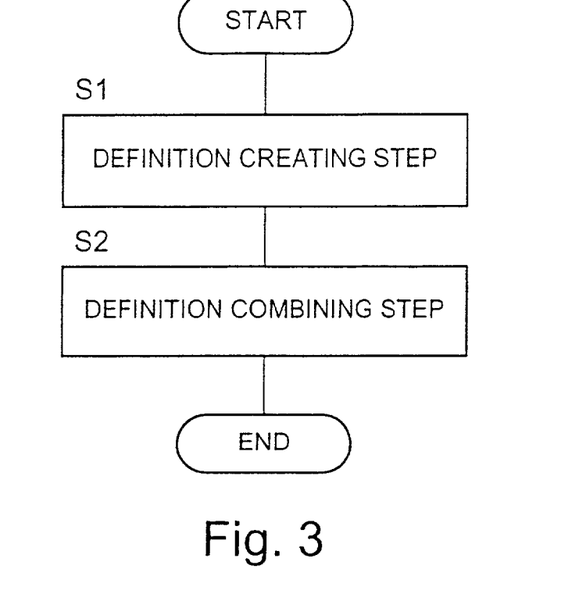
FIG. 3 is a flowchart useful for understanding an embodiment of a color conversion definition creating method according to the present invention.
Figure 4:
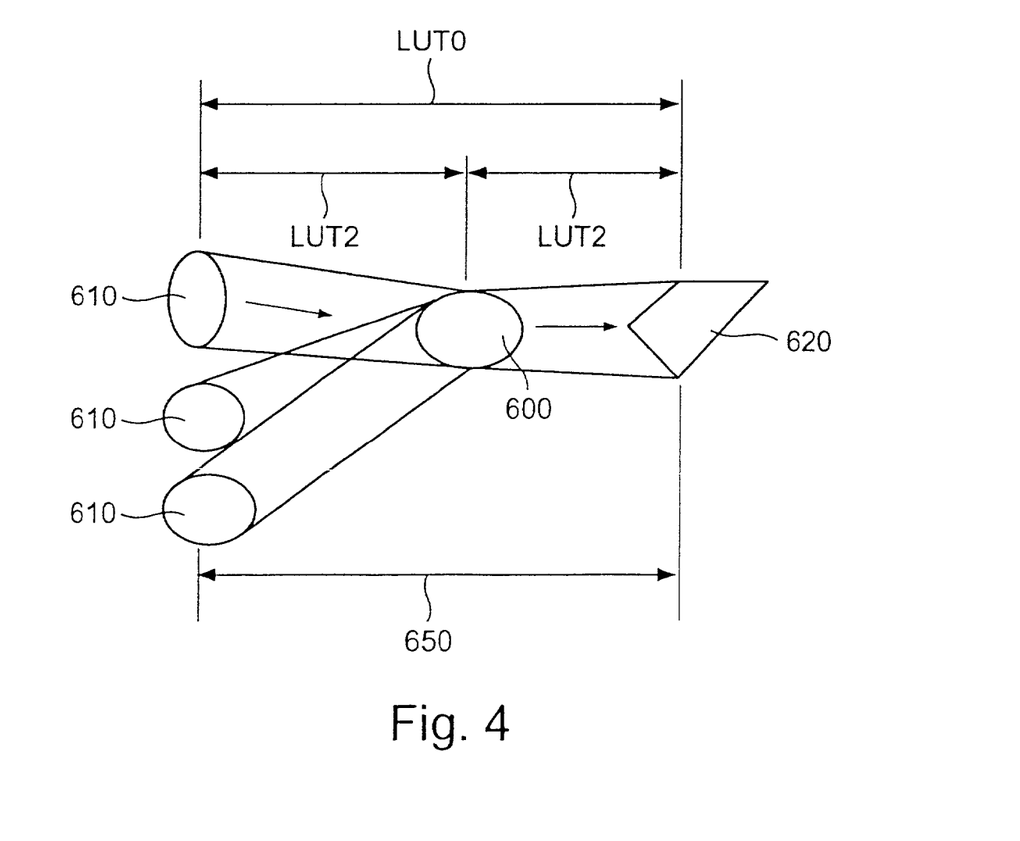
FIG. 4 is a conceptual useful for understanding an embodiment of a color conversion definition creating method according to the present invention.

FIG. 3 is a flowchart useful for understanding an embodiment of a color conversion definition creating method according to the present invention. FIG. 4 is a conceptual useful for understanding an embodiment of a color conversion definition creating method according to the present invention.

This color conversion definition creating method includes a definition creation process (a step S1 in FIG. 3) and a definition combination process (a step S2 in FIG. 3). This color conversion definition creating method is established on condition that a predetermined reference color representation area (a reference gamut) 600 shown in FIG. 4 is given. Here, as the reference color representation area, a color representation area for a reference device, which will be described latter, is used. Further, according to the color conversion definition creating method, there is created a color conversion definition LUT0 defining the association between a color in a color representation area (an arbitrary gamut) 610 of an arbitrary device (for example, the first printer 200 and the second printer 500 in FIG. 1) optionally selected from among various types of devices, and a color in a color representation area (a target gamut) 620 of a predetermined target device (for example, the CRT display 102 in FIG. 1). FIG. 4 exemplarily shows three arbitrary gamuts 610 and one target gamut 620.

A color conversion definition LUT2, which defines a gamut mapping between the reference gamut 600 and the target gamut 620, is created taking sufficient deal of labor and time beforehand, using a know-how and the like. For this reason, even if the reference gamut 600 is greatly different from the target gamut 620, it is possible to create a high quality of color conversion definition LUT2.

When an arbitrary device is selected from among various types of devices, the definition creation process (the step S1 in FIG. 3) creates a color conversion definition LUT1, which defines a gamut mapping between the arbitrary gamut 610 and the reference gamut 600. In the event that the arbitrary gamut 610 and the reference gamut 600 are in the above-mentioned "close" relation, the color conversion definition LUT1 is created easily and with high quality in accordance with the conventional algorithm and the like.

When two the color conversion definition LUT1 and the color conversion definition LUT2 thus created are simply combined, there is created the color conversion definition LUT0 defining a gamut mapping 650 between the arbitrary gamut 610 and target gamut 620. This color conversion definition LUT0 is a high quality of color conversion definition. According to the gamut mapping 650 according to the color conversion definition LUT0, the conversion between image data for the arbitrary device and image data for the arbitrary device is performed keeping a natural impression for images.

Hereinafter, there will be described in detail an important matter for creating such a high quality of color conversion definition LUT0.

As mentioned above, in the event that the arbitrary gamut 610 and the reference gamut 600 are in the above-mentioned "close" relation, the color conversion definition LUT1, which defines the gamut mapping between the arbitrary gamut 610 and the reference gamut 600, is created with high quality, so that the color conversion definition LUT0, which defines the gamut mapping between the arbitrary gamut 610 and the target gamut 620, is also created with high quality. Further, as mentioned above, the concept of "close" includes three meanings. High quality of color conversion definitions LUT0 and LUT1 are obtained when the arbitrary gamut 610 and the reference gamut 600 are "close" to one another in meaning of at least any one of those three meanings.

Figure 5:
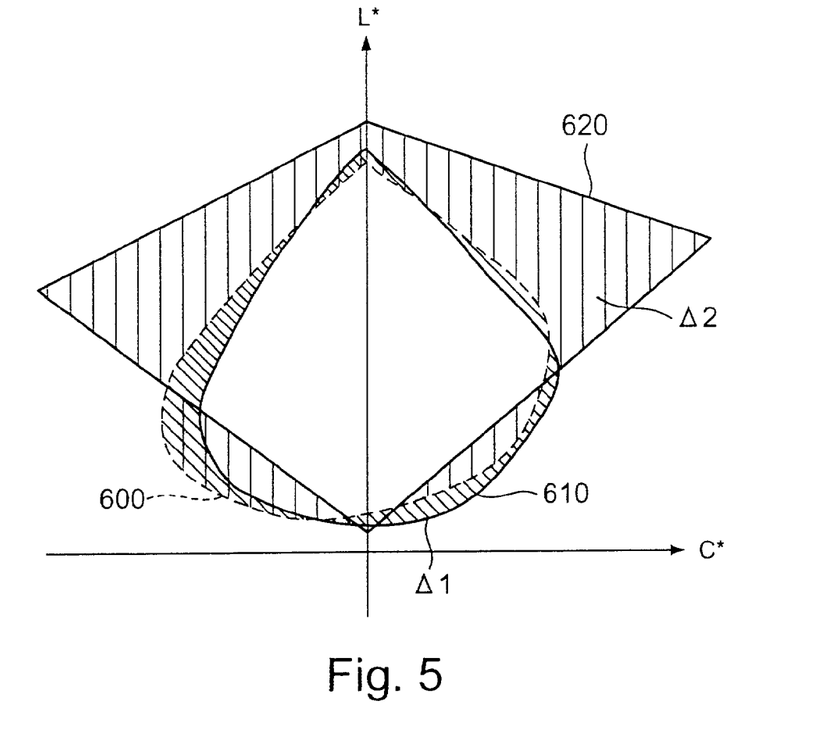
FIG. 5 is a view showing an example of a mutual relation among an arbitrary gamut, a target gamut and a reference gamut.

FIG. 5 is a view showing an example of a mutual relation among an arbitrary gamut, a target gamut and a reference gamut.

In FIG. 5, the horizontal axis denotes a chroma saturation axis of a colorimetric color space, and the vertical axis denotes a lightness axis of a colorimetric color space. FIG. 5 shows, as an example of the arbitrary gamut 610, a round gamut, and as an example of the target gamut 620, a squarish gamut. Further, FIG. 5 shows, as an example of the reference gamut 600, a gamut similar to the arbitrary gamut 610.

A difference Δ1 between the reference gamut 600 and the arbitrary gamut 610 shown in FIG. 5 is smaller than a difference Δ2 between the reference gamut 600 and the target gamut 620. In other words, the reference gamut 600 and the arbitrary gamut 610 are in a "close" relation in the above-mentioned first meaning.

In the event that the maximum color difference between the reference gamut 600 and the arbitrary gamut 610 is not above than 40, the reference gamut 600 and the arbitrary gamut 610 are in a "close" relation in the above-mentioned second meaning. This value "40" is a value which is empirically obtained as a condition on which a sufficiently high quality of color conversion definition is created in accordance with the conventional algorithm and the like.

The reference gamut 600 is very similar to the arbitrary gamut 610, and the reference gamut 600 and the arbitrary gamut 610 are in a "close" relation in the above-mentioned third meaning.

Accordingly, the reference gamut 600 and the arbitrary gamut 610 are in a "close" relation in the above-mentioned all three meanings. But, as the important matter of the present invention, it is acceptable that the reference gamut 600 and the arbitrary gamut 610 are in a "close" relation in any one of the above-mentioned three meanings.

By the way, it is known that geometry of color representation areas depends on a sort of devices. Thereinafter, there will be described examples of the geometry of color representation areas according to the sort of devices.

In FIGS. 6 to 11, the horizontal axis denotes chroma saturation and the vertical axis denotes lightness.

Figure 6:
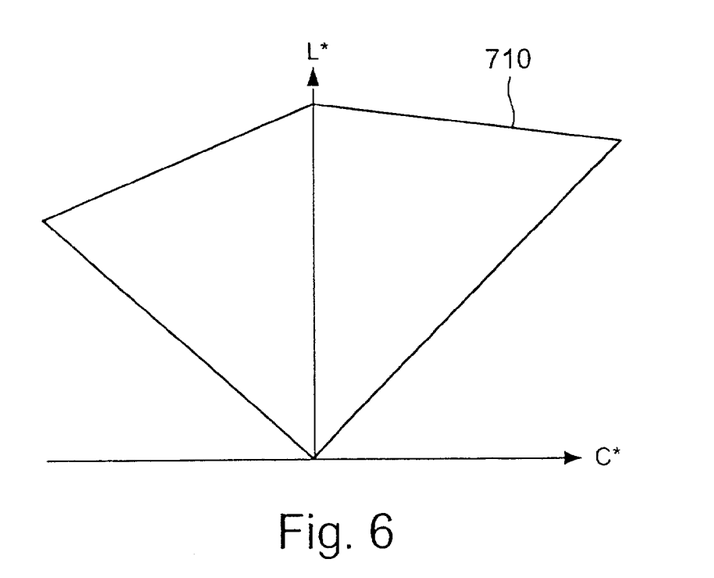
FIG. 6 is a view showing a color representation area of a CRT display.

FIG. 6 is a view showing a color representation area of a CRT display.

A color representation area 710 of a CRT display is a squarish linear geometry of color representation area. A width of chroma saturation is wide in a portion of a relatively high lightness of the color representation area 710.

There are various sorts of CRT display. However, in any sort of CRT display, the same sorts of devices in view point of the CRT display have the color representation area as shown in FIG. 6.

Figure 7:
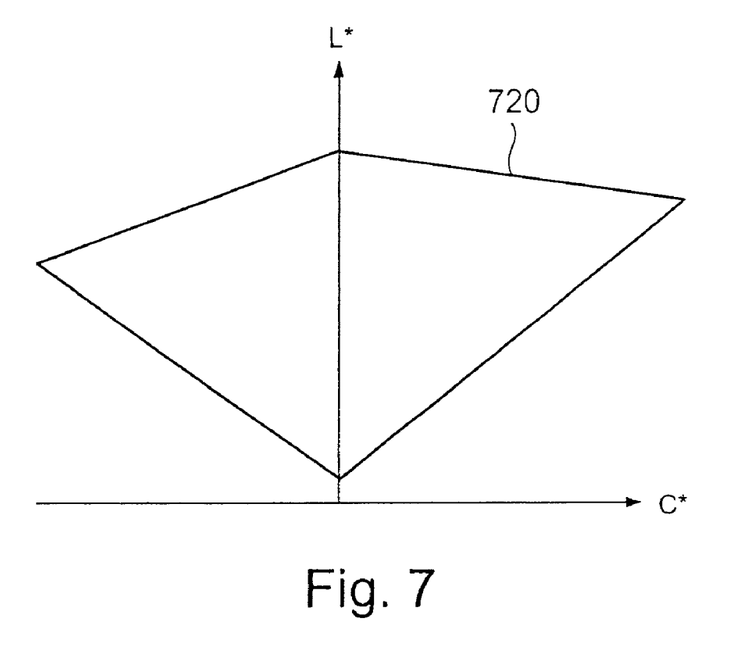
FIG. 7 is a view showing a color representation area of a liquid crystal display.

FIG. 7 is a view showing a color representation area of a liquid crystal display.

A color representation area 720 of a liquid crystal display is also a squarish linear geometry of color representation area. A width of chroma saturation is wide in a portion of a relatively high lightness of the color representation area 720. On the other hand, a width of lightness is narrower than the color representation area 710 of the CRT display in FIG. 6.

There are various sorts of liquid crystal display too. However, in any sort of liquid crystal display, the same sorts of devices in view point of the liquid crystal display have the color representation area as shown in FIG. 7.

The CRT display and the liquid crystal display are the same sort of device from the point of view that those displays are a light-emission type of device in which light is emitted in accordance with image data to display an image. Aspects common to the color representation areas of devices of types, which belong to this light-emission type of device, reside in points that the color representation areas have a squarish linear geometry in its entirety, and a width of chroma saturation is wide in a portion of a relatively high lightness of the color representation areas.

Figure 8:
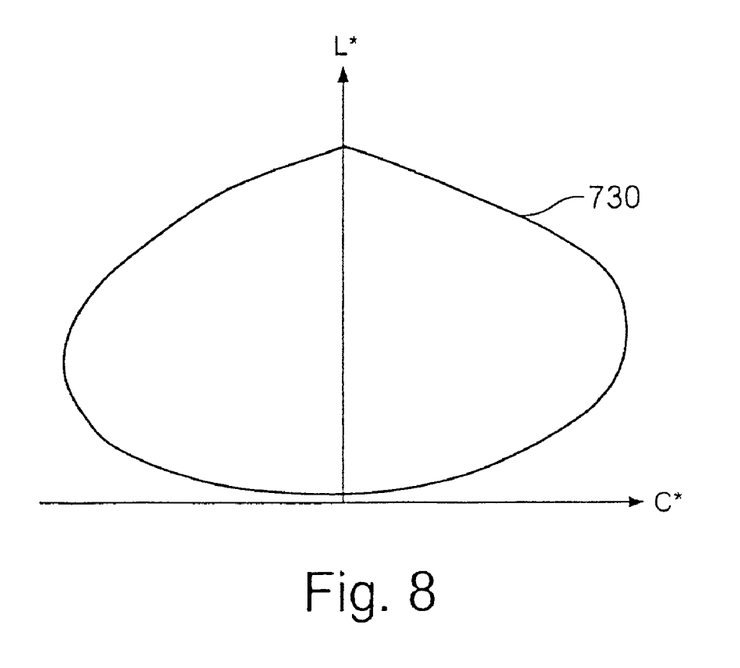
FIG. 8 is a view showing a color representation area of a photographic printer.

FIG. 8 is a view showing a color representation area of a photographic printer.

The photographic printer is a printer in which a photographic print is created in accordance with a principle of a so-called silver salt photography. According to such a printer, an image is formed in such a manner that a laser beam according to image data is projected on a printing paper including a photosensitive color material coloring in response to light. It is noted that the photosensitive color material is not restricted to the silver salt, and from the viewpoint of the photographic printer, the same sort of device includes various types of printers associated with various types of photosensitive materials.

A color representation area 730 of this photographic printer is a round shape of color representation area. A width of chroma saturation is wide in a portion of a relatively middle and low lightness in the color representation area 730. This aspect is common to the color representation area of the same sort of device in a viewpoint of the photographic printer.

Figure 9:
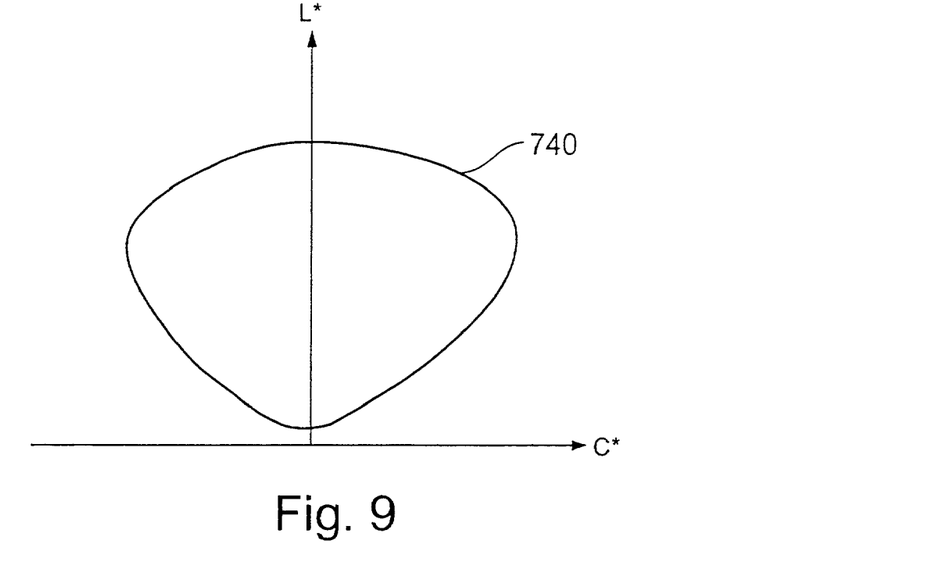
FIG. 9 is a view showing a color representation area of a thermal coloring printer.

FIG. 9 is a view showing a color representation area of a thermal coloring printer.

A thermal coloring printer is a printer in which an image is formed in such a manner that heat according to image data is applied to a sheet including a heat sensitive coloring material coloring in response to heat. From the viewpoint of the thermal coloring printer, the same sort of device includes various types of thermal coloring printers associated with various types of heat sensitive color materials.

A color representation area 740 of this thermal coloring printer is a round shape of color representation area. A width of chroma saturation is wide in a portion of a relatively high lightness in the color representation area 740. This aspect is common to the color representation area of the same sort of device in a viewpoint of the thermal coloring printer.

In view of a point that the photographic printer and the thermal coloring printer are a color material including type of device in which an image is formed on a medium including a material coloring in response to the stimulation in such a manner that a predetermined sort of stimulation is applied to the medium in accordance with image data, the photographic printer and the thermal coloring printer are the same sort of device. An aspect common to the color representation area of the same sort of device in the viewpoint of the color material including type of device resides in a point that their color representation area is a round color representation area.

Figure 10:
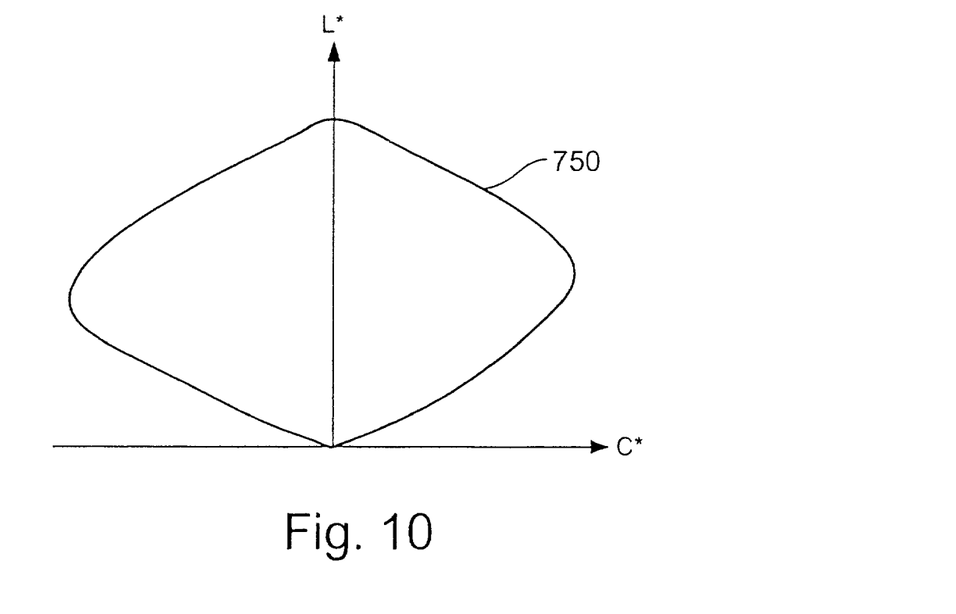
FIG. 10 is a view showing a color representation area of an inkjet printer.

FIG. 10 is a view showing a color representation area of an inkjet printer.

An inkjet printer is an ink applying type of device in which an image is formed on a medium in such a manner that ink is applied to the medium in accordance with image data.

A color representation area 750 of this inkjet printer is linear in a portion of relatively middle and low chroma saturation, and is round in a portion of relatively high chroma saturation. This aspect is common to the color representation area of the same sort of device in a viewpoint of the inkjet printer (that is, an ink applying type of device).

Figure 11:
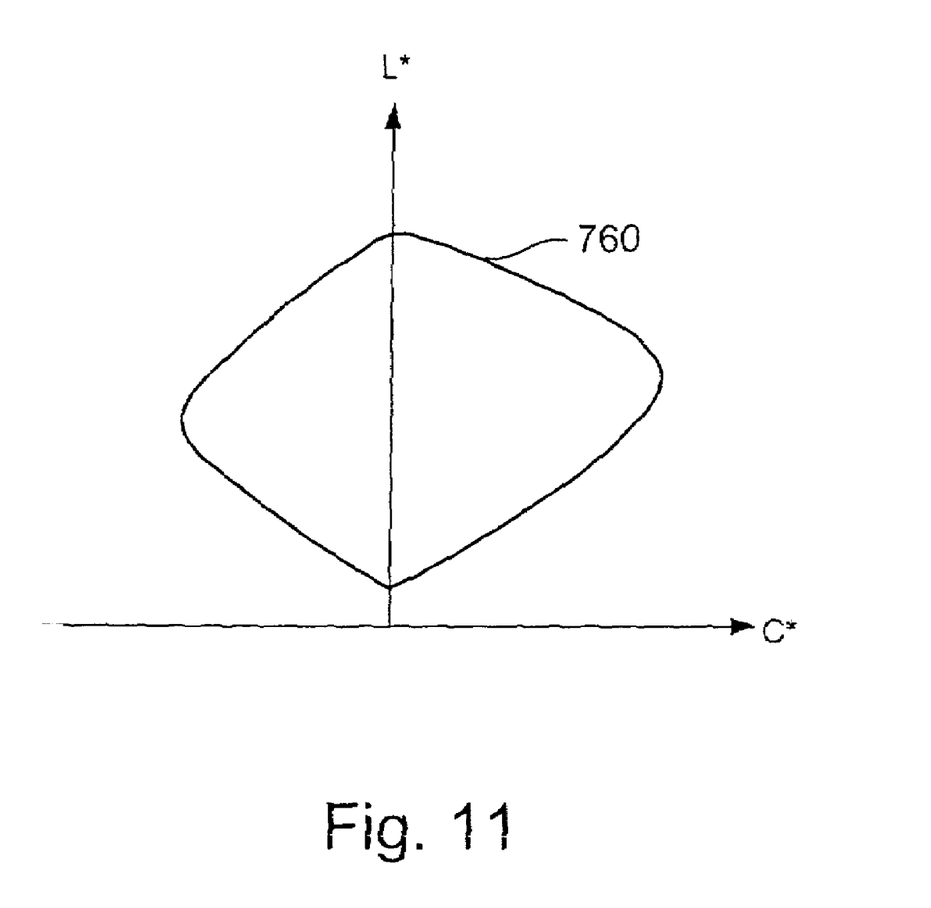
FIG. 11 is a view showing a color representation area of a color toner printer.

FIG. 11 is a view showing a color representation area of a color toner printer.

A color toner printer is a toner applying type of device in which an image is formed on a medium in such a manner that color toner is applied to the medium in accordance with image data.

A color representation area 760 of this color toner printer is linear in a portion of relatively middle and low chroma saturation, and is round in a portion of relatively high chroma saturation. The color representation area 760 is a small color representation area. This aspect is common to the color representation area of the same sort of device in a viewpoint of the color printer using a toner.

In view of a point that the inkjet printer and the color toner printer are a color material applying type of device in which an image is formed on a medium in such a manner that a color material is applied to the medium in accordance with image data, the inkjet printer and the color toner printer are the same sort of device. An aspect common to the color representation area of the color material applying type of device resides in a point that their color representation area is linear in a portion of relatively middle and low chroma saturation, and is round in a portion of relatively high chroma saturation.

In view of a point that the color material including type of device and the color material applying type of device are an object color type of device in which an image is formed on a medium in such a manner that a color material is applied to the medium in accordance with image data, the color material including type of device and the color material applying type of device are the same sort of device. An aspect common to the color representation area of the object color type of device resides in a point that their color representation area is round in a portion of relatively high chroma saturation.

Devices, which belong to the same sort in view of the above-mentioned viewpoints, have color representation areas, which are mutually in "close" relation in the above-mentioned third meaning. Here, there are enumerated devices each having a distinctive geometry of color representation area.

In the event that as the reference gamut 600 shown in FIG. 4, a color conversion area of a reference device selected for each sort of the device is presumed, and there is prepared a color conversion definition LUT2 according to the color conversion area of the reference device and the color conversion area of the target device, it is possible to create high quality of color conversion definitions LUT1 and LUT0 on all type of devices. In other words, adoption of a small number of color conversion definitions LUT2 prepared in accordance with a small number of reference devices makes it possible to readily create high quality of color conversion definitions LUT1 and LUT0 according to a number of arbitrary devices. Further, even if the environment of necessity for the gamut mapping is greatly expanded in future, only increment of a small number of color conversion definitions LUT2 according to a small number of reference devices makes it possible to readily cope with expansion of the environment.

Generally it often happens that a color conversion definition is formed in form of a LUT format. Also it often happens that the color conversion definition is functionally incorporated into a color profile of a LUT format defining a coordinate conversion among mutually different color spaces. In the following embodiments of the present invention, it is assumed that a color profile, into which the color conversion definition is functionally incorporated, is created.

Figure 12:
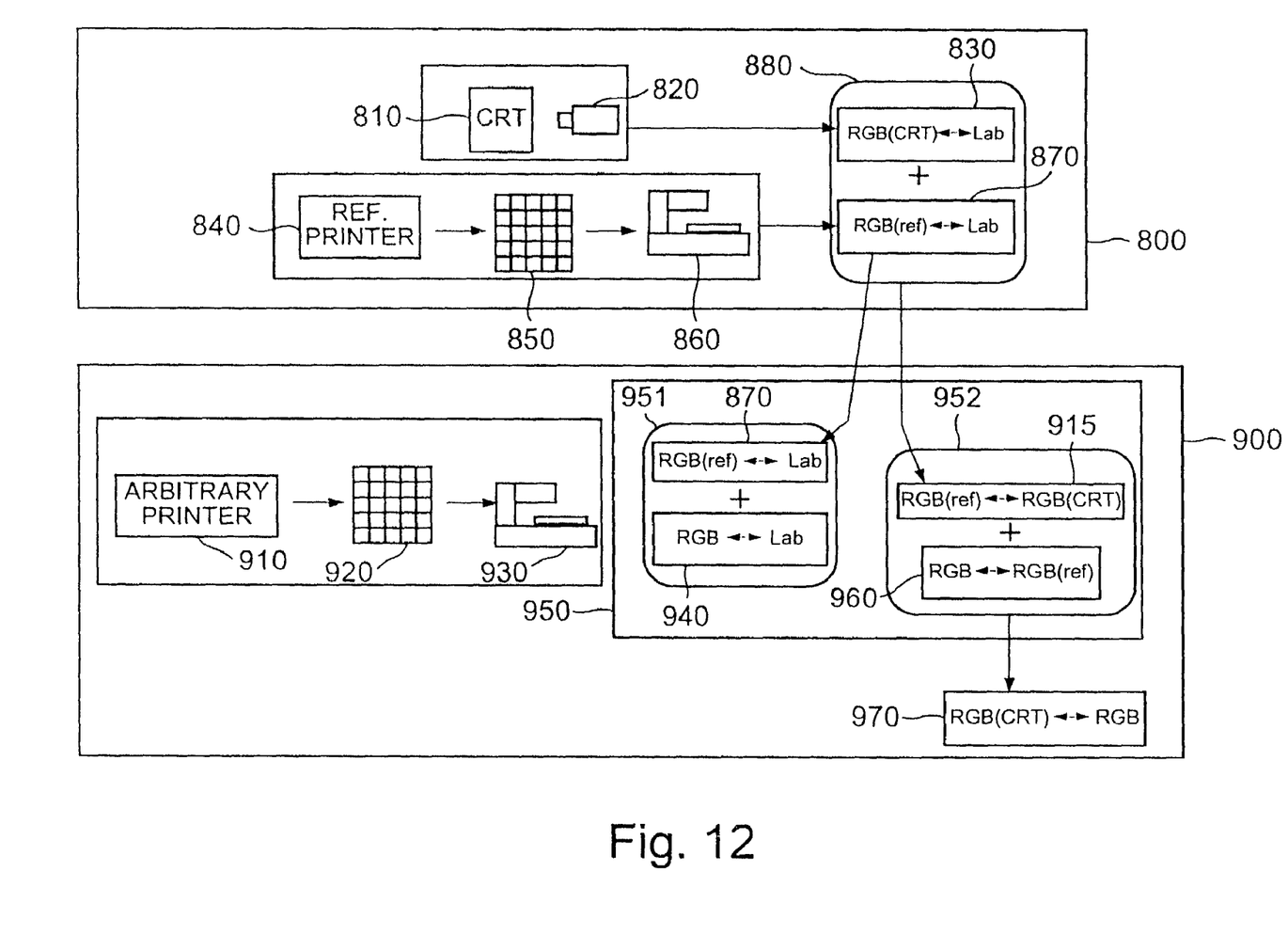
FIG. 12 is a view showing a first embodiment of a color conversion definition creating method according to the present invention.

FIG. 12 is a view showing a first embodiment of a color conversion definition creating method according to the present invention.

FIG. 12 shows a procedure of creating a color profile, into which the color conversion definition according to both a color representation area of a predetermined CRY display 810 and a color representation area of an arbitrary printer 910 to be optionally selected is functionally incorporated. Further, FIG. 12 shows working procedures in a previous step 800 before the arbitrary printer 910 is selected and in a creating step 900 after the arbitrary printer 910 is selected.

In the previous step 800, first, a predetermined color chart is displayed on a predetermined CRT display 810. The color chart consists of a number of color patches. A color of each of the color patches is measured by a colorimeter 820 to obtain colorimetric values Lab and in addition image data RGB (CRT) for the CRT display 810, which image data is representative of colors of the color patches. The colors of the color patches are involved throughout the color representation area of the CRT display 810. The color representation area of the CRT display 810 is represented by an assembly of the colorimetric values Lab. Those colorimetric values Lab are associated with image data RGB (CRT) to create a color profile 830 defining a coordinate conversion between the colorimetric space and the RGB space for the CRT display 810. Next, a reference printer 840, which is the same sort as the arbitrary printer 910 to be optionally selected, outputs a color chart 850. Colors of the color patches constituting the color chart 850 are measured by a colorimeter 860 to obtain colorimetric values Lab and in addition image data RGB (ref) for the reference printer 840, which image data is representative of colors of the color patches. The color representation area of the reference printer 840 is represented by an assembly of the colorimetric values Lab. Those colorimetric values Lab are associated with image data RGB (ref) to create a color profile 870 defining a coordinate conversion between the colorimetric space and the RGB space for the reference printer 840.

In a profile creating process 880 of the previous step, a color profile 915, which defines a coordinate conversion between the RGB space for the reference printer 840 and the RGB space for the CRT display 810, is created in accordance with those two color profiles 830 and 870. The profile creating process 880 creates the color profile 915 taking sufficient deal of labor and time so that a coordinate conversion according to the color profile 915 maintains a natural impression for an image. In the profile creating process 880, assemblies of colorimetric values Lab represented by two color profiles 830 and 870 are associated with one another completely. In effect, the color profile 915 functionally incorporates thereinto the color conversion definition LUT2 shown in FIG. 4.

Thereafter, in the creating step 900, first, the arbitrary printer 910 outputs a color chart 920, and a colorimeter 930 measures colors of color patches constituting the color chart 920 to obtain colorimetric values Lab. Assembly of the colorimetric values Lab represents a color representation area of the arbitrary printer 910. Further, in the creating step 900, there is obtained image data RGB for the arbitrary printer 910. Those colorimetric values Lab are associated with image data RGB, so that there are created a color profile 940 defining a coordinate conversion between the colorimetric space and the RGB space for the arbitrary printer 910.

Next, a first embodiment 950 of the present invention is executed by a computer system. According to the first embodiment 950 of the present invention, there are used a color profile 870 created using the reference printer 840 in the previous step 800, and a color profile 915 created in the profile creating process 880 in the previous step 800.

In a profile creating process 951 of the first embodiment 950, a color profile 960 defining a coordinate conversion between the RGB space for the reference printer 840 and the RGB space for the arbitrary printer 910 is created by an automatic algorithm in accordance with a color profile 870 created using the reference printer 840 and a color profile 940 created using the arbitrary printer 910. The automatic algorithm used in the profile creating process 951 creates the color profile 960 in such a manner that the coordinate conversion according to the color profile 960 maintains the natural impression for an image. According to the automatic algorithm, assemblies of colorimetric values Lab represented by the color profiles 870 and 940 are completely associated with one another. In effect, the color profile 960 functionally incorporates therein the color conversion definition LUT1 shown in FIG. 4.

Finally, in a profile combination process 952 of the first embodiment 950, the color profile 915 created in the profile creating process 880 in the previous step 800 is simply combined with the color profile 960 created in the profile creating process 951 in the creating step 900, so that there is created a color profile 970 defining a coordinate conversion between the RGB space for the CRT display 810 and the RGB space for the arbitrary printer 910. Both the color profiles 915 and 960, that are the base for the color profile 970, represent the coordinate conversion maintaining the natural impression for an image. Accordingly, the color profile 970 also represents the coordinate conversion maintaining the natural impression for an image. The color profile 970 functionally incorporates therein the color conversion definition LUT0 shown in FIG. 4.

When the computer system converts image data in accordance with the color profile 970 thus created, the natural impression for an image represented by the image data is maintained.

Figure 13:
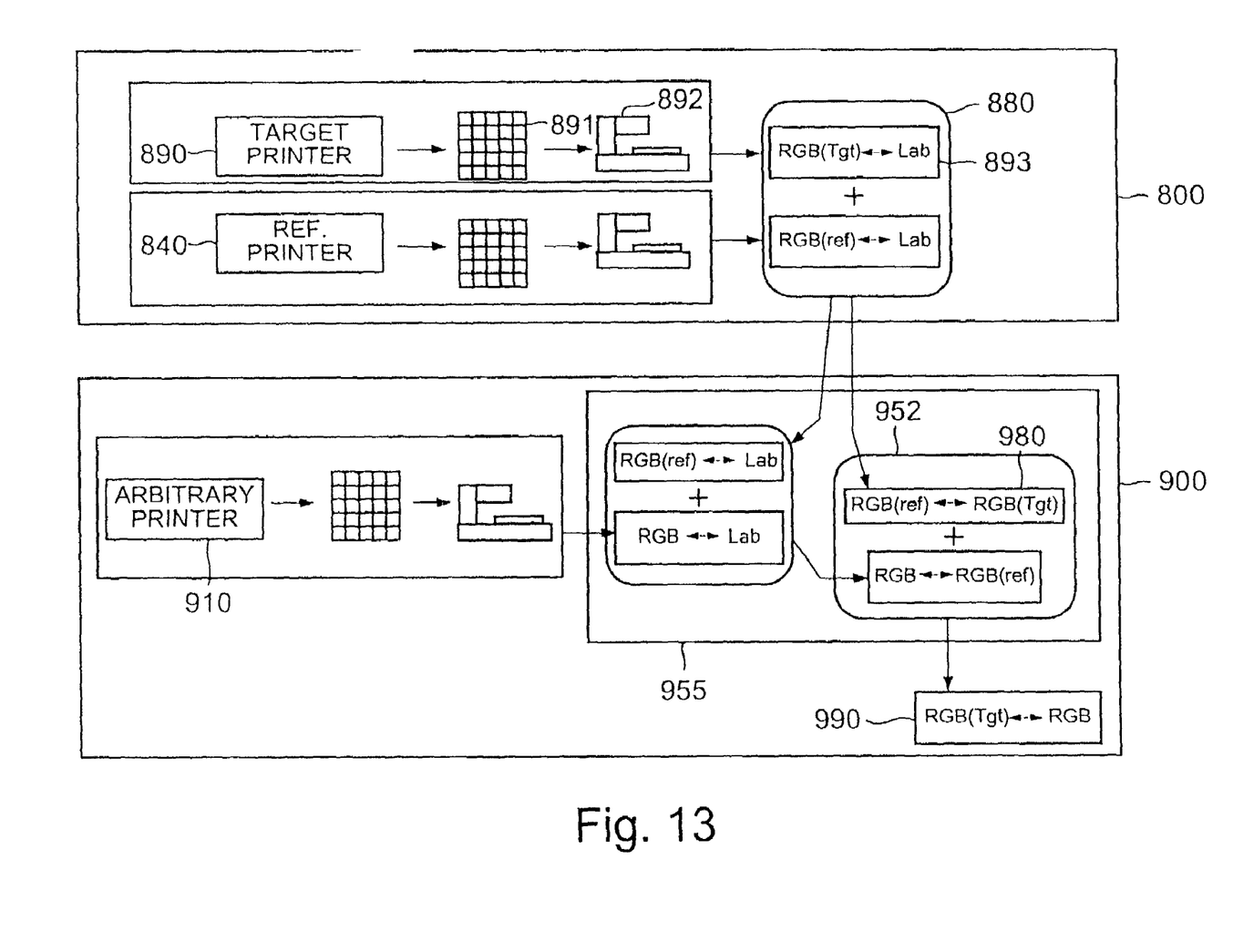
FIG. 13 is a view showing a second embodiment of a color conversion definition creating method according to the present invention.

FIG. 13 is a view showing a second embodiment of a color conversion definition creating method according to the present invention.

The procedures shown in FIG. 13 are the same as those shown in FIG. 12 except for a point that the CRT display 810 shown in FIG. 12 is replaced by a predetermined target printer 890. Hereinafter, there will be described only different procedures and redundant description will be omitted.

As the target printer 890 is adopted, in the previous step 800, the target printer 890 outputs a color chart 891. Colors of the color patches constituting the color chart 891 are measured by a colorimeter 892 to obtain colorimetric values Lab. And in addition there is also obtained image data RGB (Tgt) for the target printer 890, which represents of colors of the color patches. The colorimetric values Lab are associated with the image data RGB (Tgt), so that there is created a color profile 893 defining a coordinate conversion between the colorimetric space and the RGB space for the target printer 890.

In the profile creating process 880 of the previous step, similar to the explanation in FIG. 12, a color profile is created. However, in this case, as the source of the profile creation, the color profile 893 based on the target printer 890 is used. A color profile 980, which is created in the profile creating process 880, defines a coordinate conversion between the RGB space for the reference printer 840 and the RGB space for the target printer 890.

Likely, in the profile combination process 952 of the second embodiment 955 of the present invention that is executed in the creating step 900, in a similar fashion to that of the explanation in FIG. 12, the color profiles are combined. Here, however, as the source of the profile combination, there is used the color profile 980, which is created in the profile creating process 880 in the previous step 800. Accordingly, a color profile 990, which is created in the profile combination process 952, defines a coordinate conversion between the RGB space for the arbitrary printer 910 and the RGB space for the target printer 890.

Also in the event that the computer system converts image data in accordance with the color profile 990, the natural impression for an image represented by the image data is maintained.

Incidentally, according to the embodiments as mentioned above, as the color spaces for the devices there are used the RGB space. However, it is acceptable that the color spaces for the devices are CMY spaces, CMYK spaces or other color spaces.

As mentioned above, according to the present invention, it is possible to readily create a high quality of color conversion definition.

Although the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color conversion definition creating method of creating a color conversion definition defining an association between a color in a color representation area of an arbitrary device mediating between a color image and image data and a color in a color representation area of a predetermined target device mediating between a color image and image data, said color conversion definition creating method comprising:
    a definition creating step of creating a first color conversion defining an association between a color in a predetermined reference color representation area wherein an area difference between the reference color representation area and the color representation area of the arbitrary device is smaller than an area difference between the reference color representation area and the color representation area of the target device, and a color in the color representation area of the arbitrary device; and
    a definition combination step of combining a second color conversion definition created beforehand defining an association between a color in the reference color representation area and a color in a color representation area of the target device, with the first color conversion definition created in said definition creating step.

2. A color conversion definition creating method of creating a color conversion definition defining an association between a color in a color representation area of an arbitrary device mediating between a color image and image data and a color in a color representation area of a predetermined target device mediating between a color image and image data, said color conversion definition creating method comprising:
    a definition creating step of creating a first color conversion defining an association between a color in a predetermined reference color representation area wherein a maximum color difference between the reference color representation area and the color representation area of the arbitrary device is not more than 40, and a color in the color representation area of the arbitrary device; and
    a definition combination step of combining a second color conversion definition created beforehand defining an association between a color in the reference color representation area and a color in a color representation area of the target device, with the first color conversion definition created in said definition creating step.

3. A color conversion definition creating program storage medium storing a color conversion definition creating program for creating a color conversion definition defining an association between a color in a color representation area of an arbitrary device mediating between a color image and image data and a color in a color representation area of a predetermined target device mediating between a color image and image data, said color conversion definition creating program storage medium storing the color conversion definition creating program for creating the color conversion definition in accordance with a color conversion definition creating method, said color conversion definition creating method comprising:
    a definition creating step of creating a first color conversion defining an association between a color in a predetermined reference color representation area wherein an area difference between the reference color representation area and the color representation area of the arbitrary device is smaller than an area difference between the reference color representation area and the color representation area of the target device, and a color in the color representation area of the arbitrary device; and
    a definition combination step of combining a second color conversion definition created beforehand defining an association between a color in the reference color representation area and a color in a color representation area of the target device, with the first color conversion definition created in said definition creating step.

4. A color conversion definition creating program storage medium storing a color conversion definition creating program for creating a color conversion definition defining an association between a color in a color representation area of an arbitrary device mediating between a color image and image data and a color in a color representation area of a predetermined target device mediating between a color image and image data, said color conversion definition, creating program storage medium storing the color conversion definition creating program for creating the color conversion definition in accordance with a color conversion definition creating method, said color conversion definition creating method comprising: a definition creating step of creating a first color conversion defining an association between a color in a predetermined reference color representation area wherein a maximum color difference between the reference color representation area and the color representation area of the arbitrary device is not more than 40, and a color in the color representation area of the arbitrary device; and a definition combination step of combining a second color conversion definition created beforehand defining an association between a color in the reference color representation area and a color in a color representation area of the target device, with the first color conversion definition created in said definition creating step.

5. A color conversion definition creating program storage medium storing a color conversion definition creating program for creating a color conversion definition defining an association between a color in a color representation area of an arbitrary device mediating between a color image and image data and a color in a color representation area of a predetermined target device mediating between a color image and image data, said color conversion definition creating program storage medium storing the color conversion definition creating program for creating the color conversion definition in accordance with a color conversion definition creating method, said color conversion definition creating method comprising:

a definition creating step of creating a first color conversion defining an association between a color in a color representation area of a reference device which is the same as the arbitrary device in sort, and a color in the color representation area of the arbitrary device; and a definition combination step of combining a second color conversion definition created beforehand defining an association between a color in the color representation area of the reference device and a color in a color representation area of the target device, with the first color conversion definition created in said definition creating step.

6. A color conversion definition creating method of creating a color conversion definition defining an association between a color in a color representation area of an arbitrary device mediating between a color image and image data and a color in a color representation area of a predetermined target device mediating between a color image and image data, said color conversion definition creating method comprising:

a definition creating step of creating a first color conversion defining an association between a color in a color representation area of a reference device which is the same as the arbitrary device in sort, and a color in the color representation area of the arbitrary device; and a definition combination step of combining a second color conversion definition created beforehand defining an association between a color in the color representation area of the reference device and a color in a color representation area of the target device, with the first color conversion definition created in said definition creating step.

7. A color conversion definition creating method according to claim 6, wherein both the arbitrary device and the reference device are a light-emission type of display device in which light is emitted in accordance with image data to display an image.

8. A color conversion definition creating method according to claim 6, wherein both the arbitrary device and the reference device are a CRT display device.

9. A color conversion definition creating method according to claim 6, wherein both the arbitrary device and the reference device are a liquid crystal display device.

10. A color conversion definition creating method according to claim 6, wherein both the arbitrary device and the reference device are an object color type of device wherein colors according to image data are applied to a medium to create an image.

11. A color conversion definition creating method according to claim 6, wherein both the arbitrary device and the reference device are a color material including type of device in which an image is formed on a medium including a material coloring in response to the stimulation in such a manner that a predetermined sort of stimulation is applied to the medium in accordance with image data.

12. A color conversion definition creating method according to claim 6, wherein both the arbitrary device and the reference device are a photosensitive coloring type of device in which an image is formed on a medium including a photosensitive coloring material coloring in response to light in such a manner that light according to image data is projected on the medium.

13. A color conversion definition creating method according to claim 6, wherein both the arbitrary device and the reference device are a heat sensitive type of device in which an image is formed on a medium including a heat sensitive coloring material coloring in response to heat in such a manner that heat according to image data is applied to the medium.

14. A color conversion definition creating method according to claim 6, wherein both the arbitrary device and the reference device are a color material applying type of device in which an image is formed on a medium in such a manner that a color material is applied to the medium in accordance with image data.

15. A color conversion definition creating method according to claim 6, wherein both the arbitrary device and the reference device are an ink applying type of device in which an image is formed on a medium in such a manner that ink is applied to the medium in accordance with image data.

16. A color conversion definition creating method according to claim 6, wherein both the arbitrary device and the reference device are a toner applying type of device in which an image is formed on a medium in such a manner that color toner is applied to the medium in accordance with image data.

* * * * *